(12) United States Patent
Shimizu

(10) Patent No.: US 11,338,406 B2
(45) Date of Patent: May 24, 2022

(54) ESTIMATING DEVICE AND ESTIMATING SYSTEM

(71) Applicant: FANUC CORPORATION, Yamanashi (JP)

(72) Inventor: Tomoki Shimizu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 96 days.

(21) Appl. No.: 17/085,057

(22) Filed: Oct. 30, 2020

(65) Prior Publication Data

US 2021/0138601 A1 May 13, 2021

(30) Foreign Application Priority Data

Nov. 8, 2019 (JP) ............................. JP2019-203365

(51) Int. Cl.
| | | |
|---|---|---|
| *B23Q 15/12* | (2006.01) | |
| *B23Q 15/14* | (2006.01) | |
| *G05B 19/404* | (2006.01) | |
| *B23Q 17/09* | (2006.01) | |
| *B23Q 17/22* | (2006.01) | |

(52) U.S. Cl.
CPC ......... *B23Q 17/0961* (2013.01); *B23Q 15/12* (2013.01); *B23Q 15/14* (2013.01); *B23Q 17/2233* (2013.01); *G05B 19/404* (2013.01); *B23Q 2717/003* (2013.01)

(58) Field of Classification Search
None
See application file for complete search history.

(56) References Cited

U.S. PATENT DOCUMENTS

2008/0164834 A1* 7/2008 Iwashita .............. G05B 19/404
318/632

FOREIGN PATENT DOCUMENTS

| JP | 02-311241 A | 12/1990 |
| JP | 2003-195917 A | 7/2003 |
| JP | 3792209 B2 | 7/2006 |

* cited by examiner

*Primary Examiner* — Ryan A Jarrett
(74) *Attorney, Agent, or Firm* — Robert P. Michal, Esq.; Carter, DeLuca & Farrell LLP

(57) ABSTRACT

An estimating device estimating a rotary axis position of a workpiece includes first and second position acquisition units acquiring tool positions in first and second directions, a load acquisition unit acquiring first and second directional loads of the tool in the first and second directions, a determination unit determining whether or not the first and second directional loads each are a threshold or less, a turning control unit performing a lathe turning on the workpiece until the first directional load becomes the threshold or less and thereafter performing a lathe turning thereon until the second directional load becomes the threshold or less, and an estimating unit estimating the rotary axis position based on a first directional position of the tool when the first directional load has become the threshold or less, and a second directional position thereof when the second directional load has become the threshold or less.

9 Claims, 11 Drawing Sheets

ESTIMATING DEVICE AND ESTIMATING SYSTEM

CROSS-REFERENCE TO RELATED APPLICATION

This application is based upon and claims the benefit of priority from Japanese Patent Application No. 2019-203365 filed on Nov. 8, 2019, the contents of which are incorporated herein by reference.

BACKGROUND OF THE INVENTION

Field of the Invention

The present invention relates to an estimating device and an estimating system configured to estimate the position of a rotary axis of a machined object that is subjected to a lathe turning process.

Description of the Related Art

Japanese Laid-Open Patent Publication No. 2003-195917 discloses an example of a machine tool that performs a turning (lathing) process. The turning process is a machining process performed in a state in which a machined object is rotated. As disclosed therein, the turning process is performed by causing a workpiece (machined object) to be rotated about a C-axis (rotary axis).

SUMMARY OF THE INVENTION

In the turning process, a portion corresponding to a center of rotation (rotary axis) of the machined object may remain in place without being subject to turning (lathing). It is preferable that such a remaining portion be removed. Removal of the remaining portion is performed by grasping a position of the rotary axis, and exactly fitting a tool onto such a position.

In this instance, the aforementioned remaining portion cannot be removed if the tool is deviated even slightly from the position of the rotating shaft. Accordingly, in order to remove the remaining portion, the position of the rotary axis needs to be estimated as accurately as possible. Until now, the position of the rotary axis has been estimated by an operator repeatedly carrying out the fitting operation in a trial and error manner. However, such a trial and error technique is not preferable since it depends significantly on the skill of the operator.

Thus, the present invention has the object of providing an estimating device and an estimating system in which it is possible to easily and accurately estimate the position of the rotary axis of a machined object that is subjected to a lathe turning process.

One aspect of the present invention is characterized by an estimating device for estimating a position of a rotary axis in relation to a machine tool equipped with a tool, the machine tool being configured to perform a lathe turning process, by using the tool, on a workpiece that rotates about the rotary axis, the machine tool including a first motor configured to cause the tool to move relatively with respect to the workpiece along a first direction perpendicular to the rotary axis, and a second motor configured to cause the tool to move relatively with respect to the workpiece along a second direction perpendicular to the rotary axis and the first direction, the estimating device including a first position acquisition unit configured to acquire a position of the tool in the first direction, a second position acquisition unit configured to acquire a position of the tool in the second direction, a load acquisition unit configured to acquire a first directional load of the tool in the first direction, and a second directional load of the tool in the second direction, a determination unit configured to determine whether or not the first directional load and the second directional load are less than or equal to a predetermined threshold value, a turning control unit configured to, by controlling the first motor based on a first command, perform a lathe turning process on the workpiece until the first directional load becomes less than or equal to the threshold value, and thereafter, by controlling the second motor based on a second command, perform a lathe turning process on the workpiece until the second directional load becomes less than or equal to the threshold value, and an estimating unit configured to select, as a first directional position, a position of the tool in the first direction at a time when the first directional load has become less than or equal to the threshold value, select, as a second directional position, a position of the tool in the second direction at a time when the second directional load has become less than or equal to the threshold value, and estimate a position of the rotary axis on a plane defined by the first direction and the second direction, based on the selected first directional position and the selected second directional position.

Another aspect of the present invention is characterized by an estimating system equipped with a plurality of the machine tools each containing, from among the estimating device according to the above-described aspect, the estimating device which is further equipped with a compensation unit configured to compensate a first directional position and a second directional position, the estimating system including a management device connected to the plurality of machine tools, wherein at least one of the estimating devices of the machine tools further includes a model function configured to determine a first directional compensation amount based on the first directional load, and to determine a second directional compensation amount based on the second directional load, an input unit to which the position of the rotary axis observed by an operator after completion of a lathe turning process is input, a learning unit configured to optimize the model function in a manner so that a difference between the position of the rotary axis as compensated by the compensation unit and the position of the rotary axis as observed by the operator is minimized, and an output unit configured to output to the management device the model function that has been optimized by the learning unit, and wherein the management device outputs the model function input thereto to another machine tool, and the machine tool to which the model function has been input from the management device compensates the position of the rotary axis based on the first directional compensation amount and the second directional compensation amount as determined by the model function.

According to the present invention, the estimating device and the estimating system are provided, in which it is possible to easily and accurately estimate the position of the rotary axis of a workpiece that is subjected to a lathe turning process.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Hereinafter, a preferred embodiment of an estimating device and an estimating system according to the present invention will be presented and described in detail below with reference to the accompanying drawings.

First Embodiment

Figure 1:
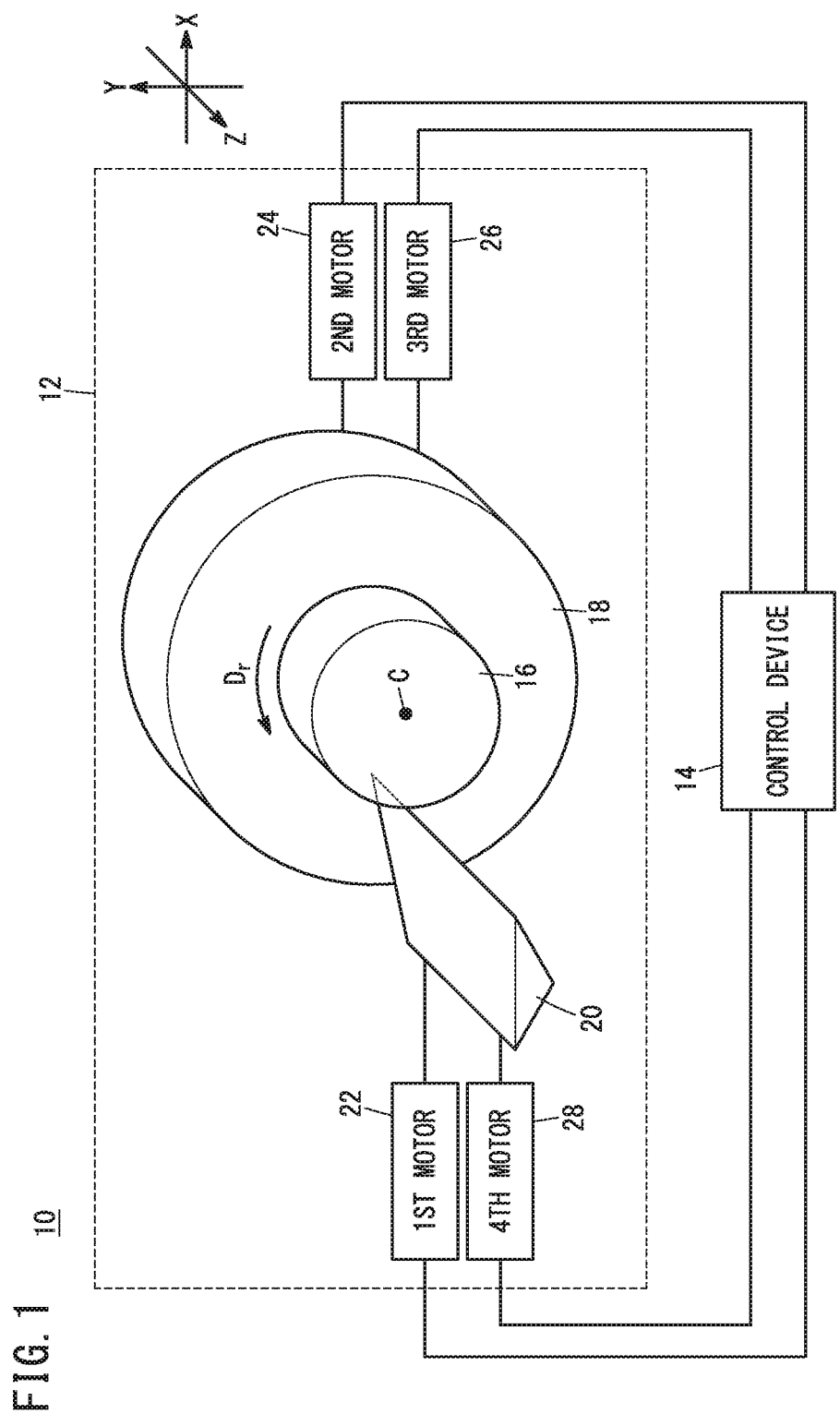
FIG. 1 is a schematic configuration diagram of a machine tool according to a first embodiment.

FIG. 1 is a schematic configuration diagram of a machine tool 10 according to a first embodiment. In the present embodiment, a first direction (X-axis direction), a second direction (Y-axis direction), and a third direction (Z-axis direction) are directions that are perpendicular to each other.

The machine tool 10 according to the present embodiment is equipped with a processing machine 12 and a control device 14. The processing machine 12 is a machine that subjects a machined object (workpiece or object to be machined) 16 to a turning process (lathe turning process). The machined object 16 is not of a configuration of being possessed by the processing machine 12 (see FIG. 1).

The processing machine 12 of the present embodiment, although not limited thereto, is also referred to as a precision processing machine, which serves to machine the machined object 16 according to a command with a machining accuracy of less than or equal to 100 nm (nanometers). The estimating device 30 of the present embodiment, as will be described later, is disposed in the control device 14.

The processing machine 12 comprises a spindle 18, a tool 20, a first motor 22, a second motor 24, a third motor 26, and a fourth motor 28. The machined object 16 is attached to the spindle 18. Consequently, the machined object 16 is supported on the spindle 18. The tool 20 includes a blade for cutting the machined object 16.

The first motor 22, the second motor 24, and the fourth motor 28 are linear motors. Further, the third motor 26 is a spindle motor. The first motor 22 and the fourth motor 28 are connected to the tool 20, and the second motor 24 and the third motor 26 are connected to the spindle 18. Each of the first motor 22, the second motor 24, the third motor 26, and the fourth motor 28 is controlled by the control device 14 via a non-illustrated amplifier.

The first motor 22, by being driven, causes the tool 20 to move along the first direction. Consequently, relative movement of the tool 20 with respect to the machined object 16 is carried out along the first direction.

The second motor 24, by being driven, causes the spindle 18 to move along the second direction. Consequently, relative movement of the tool 20 with respect to the machined object 16 is carried out along the second direction.

The third motor 26, by being driven, causes the spindle 18 to be rotated at a predetermined rotational speed about the rotary axis (axis of rotation) C of the spindle 18 which extends in the third direction. Consequently, the machined object 16 supported on the spindle 18 is also rotated about the rotary axis C. According to the present embodiment, the direction in which the spindle 18 and the machined object 16 rotate is designated by $D_r$.

The fourth motor 28, by being driven, causes the tool 20 to move along the third direction. Consequently, the tool 20 can be moved toward the machined object 16 along the third direction when subjected to the turning process, and can be retracted away from the machined object 16 along the third direction when the turning process is not performed. Moreover, a motor (fifth motor) for adjusting the orientation of a blade of the tool 20 may be further connected to the tool 20.

Figure 2:
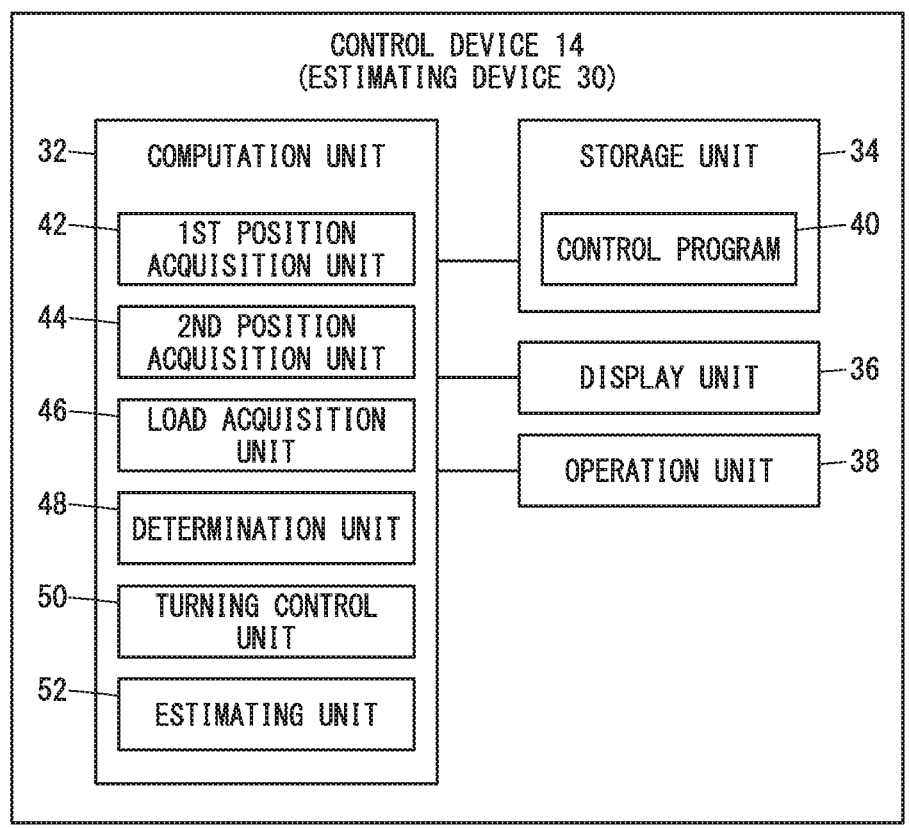
FIG. 2 is a schematic configuration diagram of a control device in which an estimating device according to the first embodiment is provided.

FIG. 2 is a schematic configuration diagram of the control device 14 in which the estimating device 30 according to the first embodiment is provided.

The control device 14 serves to control the turning process of the machined object 16 by the processing machine 12. Further, the control device 14 of the present embodiment also serves as the estimating device 30 that estimates the position of the rotary axis C. Hereinafter, a description will be given concerning the configuration of the control device 14 which also serves as the estimating device 30.

The control device 14 is equipped with a computation unit 32, a storage unit 34, a display unit 36, and an operation unit (input unit) 38. The computation unit 32 includes, for example, a CPU (Central Processing Unit) in the configuration thereof. The storage unit 34 includes, for example, a ROM (Read Only Memory) and a RAM (Random Access Memory), in the configuration thereof.

A control program 40, which is prepared in advance, is stored in the storage unit 34. By executing such a control program 40, the computation unit 32 appropriately executes required processes for controlling the turning process by the processing machine 12 and estimating the position of the rotary axis C.

The display unit 36, for example, is a display device equipped with a liquid crystal screen. Information concerning the turning process is appropriately displayed on the display unit 36. The information concerning the turning process, for example, are machine coordinates indicating the position of the tool 20.

The operation unit 38 is provided in order for the operator to issue instructions (commands) to the control device 14, and for example, comprises a keyboard, an operation panel, or a touch panel that is attached to the liquid crystal screen of the display unit 36.

The computation unit 32 is equipped with a first position acquisition unit 42, a second position acquisition unit 44, a load acquisition unit 46, a determination unit 48, a turning control unit 50, and an estimating unit 52. These respective units are realized by the computation unit 32 executing the control program 40 in cooperation with the storage unit 34.

Both the first position acquisition unit 42 and the second position acquisition unit 44 acquire positions of the tool 20. The first position acquisition unit 42 acquires the position of the tool 20 in the first direction, and the second position acquisition unit 44 acquires the position of the tool 20 in the second direction. The position of the tool 20 in the first direction and the position of the tool 20 in the second direction can be easily and accurately measured by using, for example, a laser scale.

The load acquisition unit 46 acquires a load of the tool 20 in the first direction and a load of the tool 20 in the second direction. Hereinafter, the load in the first direction of the tool 20 is also referred to as a first directional load $L_1$. Further, the load in the second direction of the tool 20 is also referred to as a second directional load $L_2$.

The first directional load $L_1$, for example, is a drive current or a torque of the first motor 22. In this instance, the drive current is a current for driving the first motor 22. Further, the torque refers to the thrust force generated by the first motor 22 which is a linear motor.

The drive current and the torque exhibit larger values when the tool 20 is cutting the machined object 16 in comparison with when the tool 20 is not cutting the machined object 16. The drive current and the torque of the first motor 22 can be detected respectively by providing a current sensor and a torque sensor in the first motor 22.

Similarly, the second directional load $L_2$ is a drive current or a torque of the second motor 24. The drive current and the torque of the second motor 24 can be detected respectively by providing a current sensor and a torque sensor in the second motor 24.

The first directional load $L_1$ and the second directional load $L_2$ can also be acquired based on a fluctuation range of positional deviation. Such positional deviation is a deviation of the actual position of the tool 20 from the position of the tool 20 commanded by the estimating device 30. Moreover, the position of the tool 20 according to the present embodiment refers to a relative position thereof with respect to the machined object 16. The fluctuation range of deviation is expressed by a difference, among values of the fluctuating deviation, between a maximum value and a minimum value that are closest to each other in time-series, or alternatively, a difference between a reference value and a maximum value (or minimum value) of the deviation.

The fluctuation range of the positional deviation exhibits a larger value when the tool 20 is cutting the machined object 16 in comparison with when the tool 20 is not cutting the machined object 16. In this case, the load acquisition unit 46 is capable of acquiring, as the first directional load $L_1$, the fluctuation range of deviation of the position acquired by the first position acquisition unit 42 from the position indicated by the first command. The acquired fluctuation range, after having been appropriately compensated, may be also acquired as the first directional load $L_1$.

Similarly, the load acquisition unit 46 is capable of acquiring, as the second directional load $L_2$, the fluctuation range of deviation (or alternatively, the compensated fluctuation range) of the position acquired by the second position acquisition unit 44 from the position indicated by the second command. Descriptions will be given later concerning the first command and the second command.

The load acquisition unit 46 may acquire either the first directional load $L_1$ based on the drive current or the torque, or may acquire the first directional load $L_1$ based on the fluctuation range of the positional deviation. The same applies to the second directional load $L_2$. However, in the case that the first directional load $L_1$ is acquired based on the drive current, the second directional load $L_2$ is also acquired based on the drive current. Similarly, in the case that the first directional load $L_1$ is acquired based on the fluctuation range of the positional deviation, the second directional load $L_2$ is also acquired based on the fluctuation range of the positional deviation.

As one example, the load acquisition unit 46 according to the present embodiment is assumed to acquire, as the first directional load $L_1$, the fluctuation range of deviation of the position acquired by the first position acquisition unit 42 from the position indicated by the first command. Further, it is assumed that the fluctuation range of deviation of the position acquired by the second position acquisition unit 44 from the position indicated by the second command is acquired as the second directional load $L_2$.

The determination unit 48 serves to determine whether or not the first directional load $L_1$ and the second directional load $L_2$ are less than or equal to a predetermined threshold value Th (i.e., whether $L_1 \leq Th$, whether $L_2 \leq Th$). In the case that the tool 20 undergoes relative movement with respect to the machined object 16 along the first direction, the determination unit 48 determines whether or not the first directional load $L_1$ is less than or equal to the threshold value Th. Further, in the case that the tool 20 undergoes relative movement with respect to the machined object 16 along the second direction, the determination unit 48 determines whether or not the second directional load $L_2$ is less than or equal to the threshold value Th.

The threshold value Th is a value that is set as a boundary between the first directional load $L_1$ and the second directional load $L_2$ at a time when turning of the machined object 16 is being carried out by the tool 20, and the first directional load $L_1$ and the second directional load $L_2$ at a time when turning is not being carried out. Such a threshold value Th can be obtained experimentally in advance. It should be noted that the phrase "at a time when turning of the machined object 16 is being carried out by the tool 20" does not include a time during which the tool 20 is not in contact with the machined object 16 in the turning process.

The turning control unit 50 controls the first motor 22 based on the first command and controls the second motor 24 based on the second command, whereby the machined object 16 is subjected to the turning process.

The first command and the second command are commands which are input to the turning control unit 50 on the basis of the control program 40, and serve to indicate a distance of relative movement of the tool 20, or alternatively, a target position of the tool 20. Moreover, according to the present embodiment, since the processing machine 12 is a precision processing machine, the first command and the second command are indicative of distances of relative movement with an accuracy of less than or equal to 100 nm. The timing at which the first command and the second command are input to the turning control unit 50, for example, is a timing when the operator has issued, via the operation unit 38, a command for estimating the position of the rotary axis C.

When the first command is input thereto, the turning control unit 50 subjects the machined object 16 to the turning process by causing the tool 20 to move relatively at a predetermined speed along the first direction. At this time, the first directional load $L_1$ in excess of the threshold value Th is applied to the tool 20. The relative movement of the tool 20 based on the first command is carried out, without changing the direction of relative movement, from the time at which the first directional load $L_1$ is in excess of the threshold value Th (from initiation of turning) until the first directional load $L_1$ becomes less than or equal to the threshold value Th.

Further, when the second command is input thereto, the turning control unit 50 subjects the machined object 16 to the turning process by causing the tool 20 to move relatively at a predetermined speed along the second direction. At this time, the second directional load $L_2$ in excess of the threshold value Th is applied to the tool 20. The relative movement of the tool 20 based on the second command is carried out, without changing the direction of relative movement, from the time at which the second directional load $L_2$ is in excess of the threshold value Th (from initiation of turning) until the second directional load $L_2$ becomes less than or equal to the threshold value Th.

The estimating unit 52 estimates the position of the rotary axis C on a plane defined by the first direction and the second direction. The estimating unit 52 selects, as a first directional position $P_x$, the position of the tool 20 in the first direction at a time when the first directional load $L_1$ has become less than or equal to the threshold value Th, and selects, as a second directional position $P_y$, the position of the tool 20 in the second direction at a time when the second directional load $L_2$ has become less than or equal to the threshold value Th. Then, based on the selected first directional position $P_x$ and the selected second directional position $P_y$, the position of the rotary axis C on the plane defined by the first direction and the second direction is estimated.

The estimating unit 52 may estimate the selected first directional position $P_x$ without being compensated, as the position of the rotary axis C in the first direction, or may estimate, as the position of the rotary axis C in the first direction, a value obtained by compensating the first directional position $P_x$. Similarly, the estimating unit 52 may estimate the second directional position $P_y$ without being compensated, as the position of the rotary axis C in the second direction, or may estimate, as the position of the rotary axis C in the second direction, a value obtained by compensating the second directional position $P_y$.

According to the present embodiment, the position of the rotary axis C is estimated by using the first directional position $P_x$ and the second directional position $P_y$ without any change (i.e., without being compensated). An example of a case in which the first directional position $P_x$ and the second directional position $P_y$ are compensated will be described later (Modification 2 and Modification 3).

Figure 3:
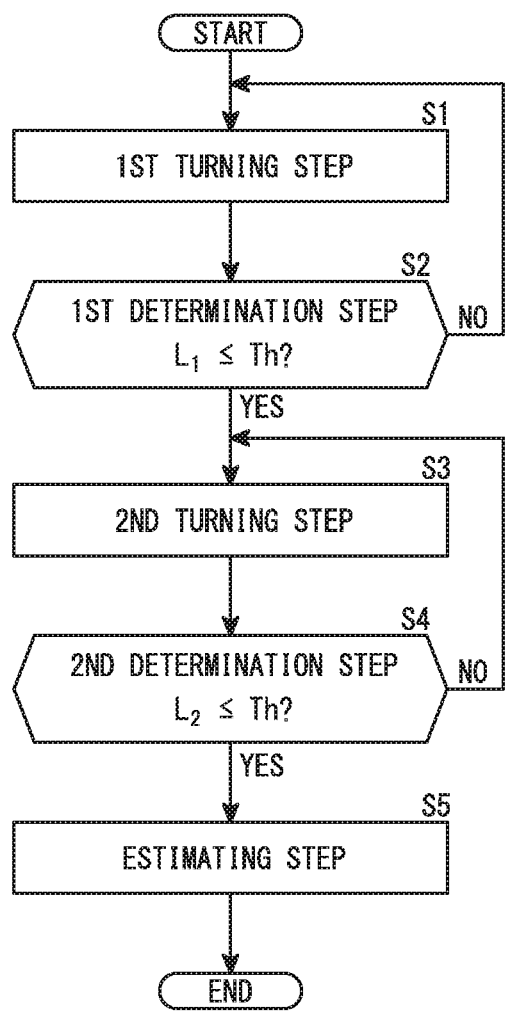
FIG. 3 is a flowchart showing an example of an estimating method, performed by the estimating device according to the first embodiment, for estimating the position of a rotary axis.

FIG. 3 is a flowchart showing an example of an estimating method, performed by the estimating device 30 according to the first embodiment, for estimating the position of the rotary axis C.

Hereinafter, a description will be given concerning a process flow of a method for estimating the position of the rotary axis C (hereinafter, also simply referred to as an estimating method) performed by the estimating device 30.

Figure 4A:
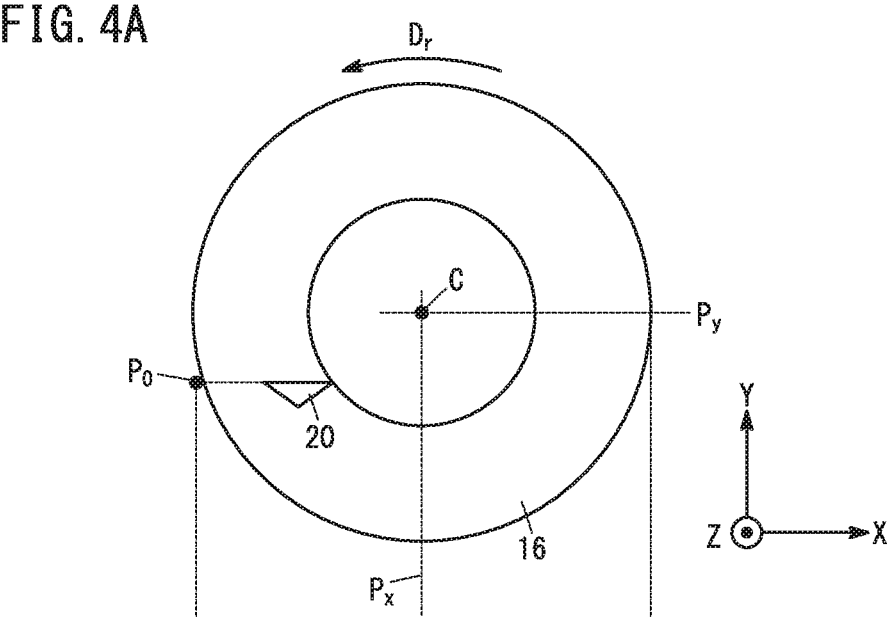
FIG. 4A is a diagram showing the state of a tool and a machined object when a first turning step is performed.
Figure 4B:
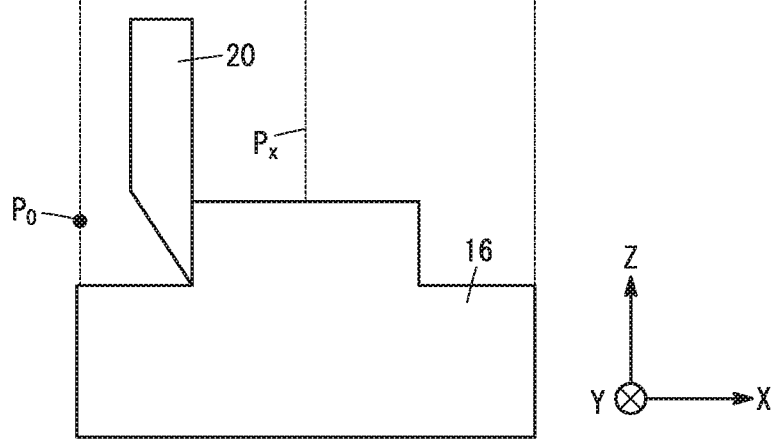
FIG. 4B shows the state shown in FIG. 4A as seen from another viewpoint.

FIG. 4A is a diagram showing the state of the tool 20 and the machined object 16 when a first turning step is being performed. FIG. 4B shows the state shown in FIG. 4A as seen from another viewpoint. It should be noted that FIG. 4A is a viewpoint as seen from the third direction, and FIG. 4B is a viewpoint as seen from the second direction.

The estimating method is started from a state in which the position of the tool 20 is aligned with an initial position $P_0$ (START). At first, the turning control unit 50 performs a lathe turning process on the machined object 16 by controlling the first motor 22 based on the first command, and until the first directional load $L_1$ becomes less than or equal to the threshold value Th (step S1: first turning step). At this time, the machined object 16 is rotating in the direction of rotation $D_r$. The direction of relative movement of the tool 20 in the first turning step is the first direction. The direction of relative movement is not changed until the first turning step has been completed, based on the result of a determination performed in a first determination step, to be described later. During the first turning step, the load acquisition unit 46 sequentially acquires the first directional load $L_1$.

Figure 5:
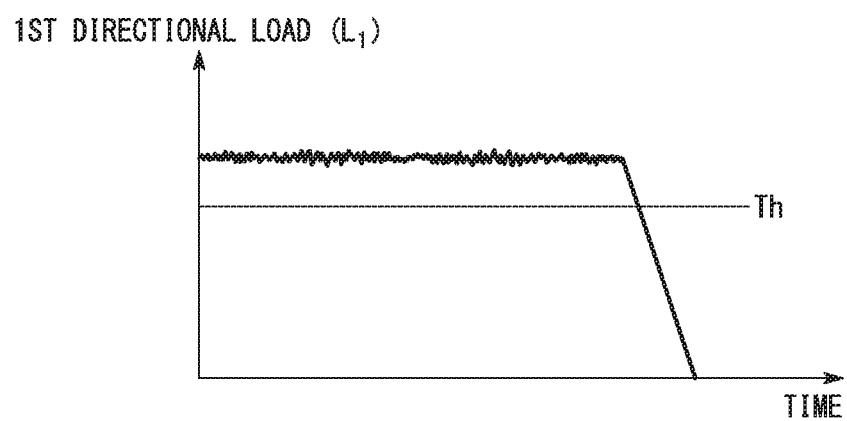
FIG. 5 is a graph showing an example of a time-series change of a load in a first direction when the first turning step is performed.

FIG. 5 is a graph showing an example of a time-series change in the first directional load $L_1$ when the first turning step is performed. The vertical axis of FIG. 5 represents a magnitude of the first directional load $L_1$, whereas the horizontal axis represents time. It should be noted that, in the graph of FIG. 5, the time before the tool 20 comes into contact with a machined surface of the machined object 16 is omitted.

During the period until the tool 20 reaches the position of the rotary axis C in the first direction, the machined object 16 is cut because the blade of the tool 20 bites into the surface of the machined object 16. Therefore, during that period, the first directional load $L_1$ continues to be in excess of the threshold value Th.

Thereafter, the tool 20 which moves relatively along the first direction arrives at the position of the rotary axis C in the first direction. When the tool 20 reaches the position of the rotary axis C in the first direction, the blade of the tool 20 no longer bites into the machined object 16, and therefore, the first directional load $L_1$ is reduced. Upon doing so, as shown in FIG. 5, the first directional load $L_1$ becomes less than or equal to the threshold value Th.

The determination unit 48, by sequentially comparing the first directional load $L_1$ and the threshold value Th, determines whether or not the first directional load $L_1$ has become less than or equal to the threshold value Th (step S2: first determination step). When the first directional load $L_1$ becomes less than or equal to the threshold value Th (YES), the estimating unit 52 selects, as the first directional position $P_x$, the position of the tool 20 in the first direction at the time when the first directional load $L_1$ has become less than or equal to the threshold value Th. Further, the estimating unit 52 stores the selected first directional position $P_x$ in the storage unit 34. As long as the first directional load $L_1$ does not become less than or equal to the threshold value Th (NO), the first turning step is continued.

Figure 6:
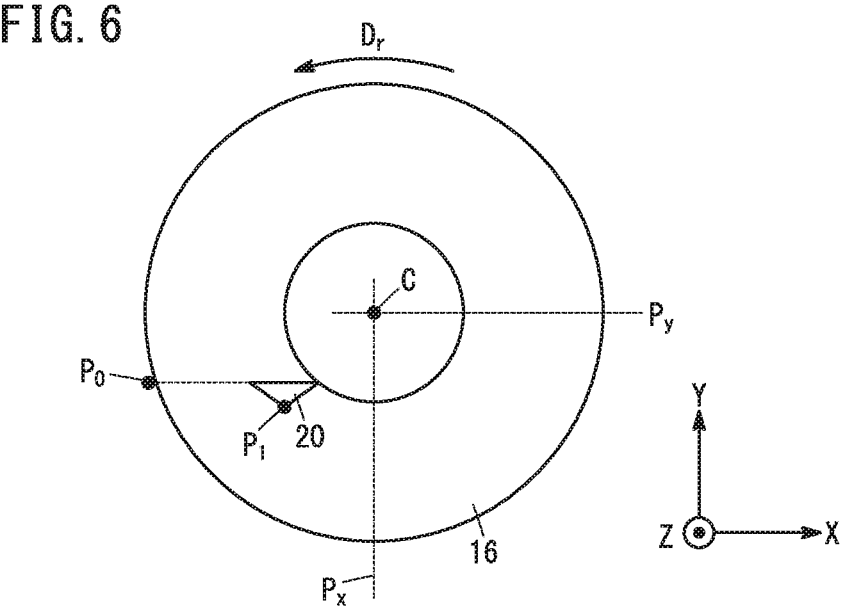
FIG. 6 is a diagram showing the state of a tool and a machined object when a second turning step is performed.

FIG. 6 is a diagram showing the state of the tool 20 and the machined object 16 when a second turning step is performed. The viewpoint shown in FIG. 6 is the same as the viewpoint shown in FIG. 4A.

If the determination result in the first determination step is YES, the turning control unit 50 performs a turning process on the machined object 16 by controlling the second motor 24 based on the second command, and until the second directional load $L_2$ becomes less than or equal to the threshold value Th (step S3: second turning step).

The reference character $P_1$ in FIG. 6 indicates the starting position of the second turning step. The starting position $P_1$ preferably lies on a path over which the tool 20 has been moved relatively in the first turning step, and preferably lies between the first directional position $P_x$ and the initial position $P_0$. In accordance with this feature, the position of the tool 20 can be made to coincide with the starting position $P_1$, merely by relatively moving the tool 20 in a direction opposite to that at the time of the first turning step.

Figure 7:
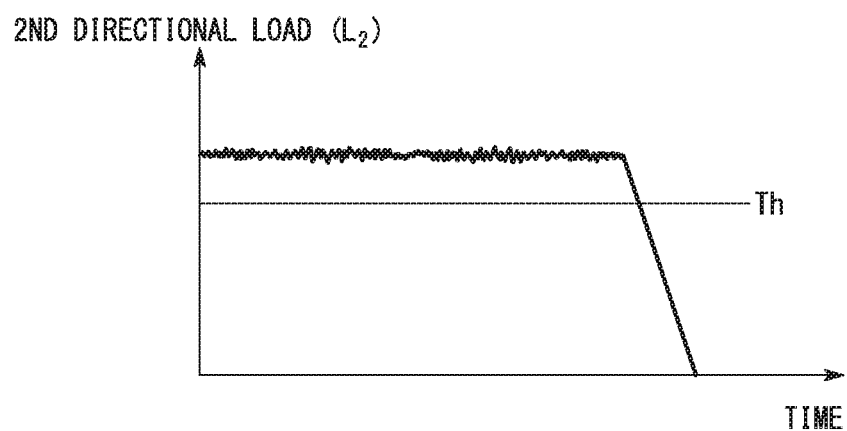
FIG. 7 is a graph showing an example of a time-series change of a load in a second direction when the second turning step is performed.

FIG. 7 is a graph showing an example of a time-series change in the second directional load $L_2$ when the second turning step is performed. The vertical axis of FIG. 7 represents a magnitude of the second directional load $L_2$, whereas the horizontal axis represents time. It should be noted that, in the graph of FIG. 7, in the same manner as in FIG. 5, the time before the tool 20 comes into contact with a machined surface of the machined object 16 is omitted.

The turning control unit 50, after having brought the position of the tool 20 into alignment with the starting position $P_1$, causes the tool 20 to move relatively along the second direction. The direction of relative movement is not changed until the second turning step has been completed, based on the result of a determination performed in a second determination step, to be described later. During the second turning step, the load acquisition unit 46 sequentially acquires the second directional load $L_2$. During the period in which the tool 20 is cutting the machined object 16, the second directional load $L_2$ continues to be in excess of the threshold value Th. Then, when the position of the tool 20 reaches the position of the rotary axis C in the second direction, the second directional load $L_2$ becomes less than or equal to the threshold value Th.

The determination unit 48, by sequentially comparing the second directional load $L_2$ and the threshold value Th, determines whether or not the second directional load $L_2$ has become less than or equal to the threshold value Th (step S4: second determination step). When the second directional load $L_2$ becomes less than or equal to the threshold value Th (YES), the estimating unit 52 selects, as the second directional position $P_y$, the position of the tool 20 in the second direction at the time when the second directional load $L_2$ has become less than or equal to the threshold value Th. Further, the estimating unit 52 stores the selected second directional position $P_y$ in the storage unit 34. As long as the second directional load $L_2$ does not become less than or equal to the threshold value Th (NO), the second turning step is continued.

When selection of the first directional position $P_x$ and the second directional position $P_y$ is completed, the estimating unit 52 estimates the position of the rotary axis C based on the above positions (step S5: estimating step). According to the present embodiment, the position of the rotary axis C is estimated by using the first directional position $P_x$ and the second directional position $P_y$ as they are without being compensated. Consequently, the estimating method is completed (END).

In the turning process, a portion of the machined object 16 that corresponds to the rotary axis C may be left remaining without being subjected to turning (lathing). In order to remove such a remaining portion, it is necessary to appropriately align the tool 20 with the position of the rotary axis C in the machined object 16.

According to the estimating device 30 of the present embodiment, the position of the rotary axis C is easily and accurately estimated. Accordingly, it is possible for the operator to easily achieve the aforementioned alignment.

As will be listed below, the present embodiment is not limited to the descriptions given above.

For example, although the case has been described in which the estimating device 30 is integrally disposed in the control device 14 of the machine tool 10, the control device 14 and the estimating device 30 may each be provided as separate devices. Further, the processing machine 12 is not limited to being a precision processing machine. More specifically, the estimating device 30 of the present embodiment may be applied to a machine tool 10 that carries out the turning process with an accuracy of greater than or equal to 101 nm.

Although it has been described above that the first motor 22 and the fourth motor 28 are connected to the tool 20, the present embodiment is not necessarily limited to this feature. The first motor 22 and the fourth motor 28 may be connected to the spindle 18. Alternatively, for example, one from among the first motor 22 and the fourth motor 28 may be connected to the tool 20, whereas the other one may be connected to the spindle 18.

It has been described above that the first motor 22, the second motor 24, and the fourth motor 28 are linear motors. The present embodiment is not necessarily limited to this feature. For example, the first motor 22, the second motor 24, and the fourth motor 28 may be servomotors. In the case that the first motor 22 and the second motor 24 are servomotors, the servomotors may be provided with rotary encoders. In such a case, by the rotary encoders of the first motor 22 and the second motor 24, respectively, the first position acquisition unit 42 and the second position acquisition unit 44 may detect the positions of the tool 20 in the first direction and the second direction. Further, in such a case, the load acquisition unit 46 may acquire the first directional load $L_1$ and the second directional load $L_2$ based on the rotational torques generated by the first motor 22 and the second motor 24, which are servomotors.

[Modifications]

Although a first embodiment has been described above as one example of the present invention, it goes without saying that various modifications or improvements are capable of being added to the above-described first embodiment. It is clear from the scope of the claims that other modes to which such modifications or improvements have been added can be included within the technical scope of the present invention.

(Modification 1)

The estimating unit 52 may select, as the first directional position $P_x$, an average value of the first directional position of the tool 20 at a time when a first load has become less than or equal to a threshold value Th, and the first directional position of the tool 20 at a time when a second load has become less than or equal to a threshold value Th.

In this instance, the first load is a first directional load based on the fluctuation range of deviation of the position acquired by the first position acquisition unit 42 from the position indicated by the first command. Further, the second load is a first directional load based on the drive current or the torque of the first motor 22. The first load and the second load can be acquired by the load acquisition unit 46.

Further, the estimating unit 52 may select, as the second directional position $P_y$, an average value of the second directional position of the tool 20 at a time when a third load has become less than or equal to a threshold value Th, and the second directional position of the tool 20 at a time when a fourth load has become less than or equal to a threshold value Th.

In this instance, the third load is a second directional load based on the fluctuation range of deviation of the position acquired by the second position acquisition unit 44 from the position indicated by the second command. Further, the fourth load is a second directional load based on the drive current or the torque of the second motor 24. Similar to the first load and the second load, the third load and the fourth load can be acquired by the load acquisition unit 46.

Due to being based on both the first load and the second load, it can be expected that the reliability of the selected first directional position $P_x$ will be enhanced. Similarly, due to being based on both the third load and the fourth load, it can be expected that the reliability of the selected second directional position $P_y$ will be enhanced.

(Modification 2)

Figure 8:
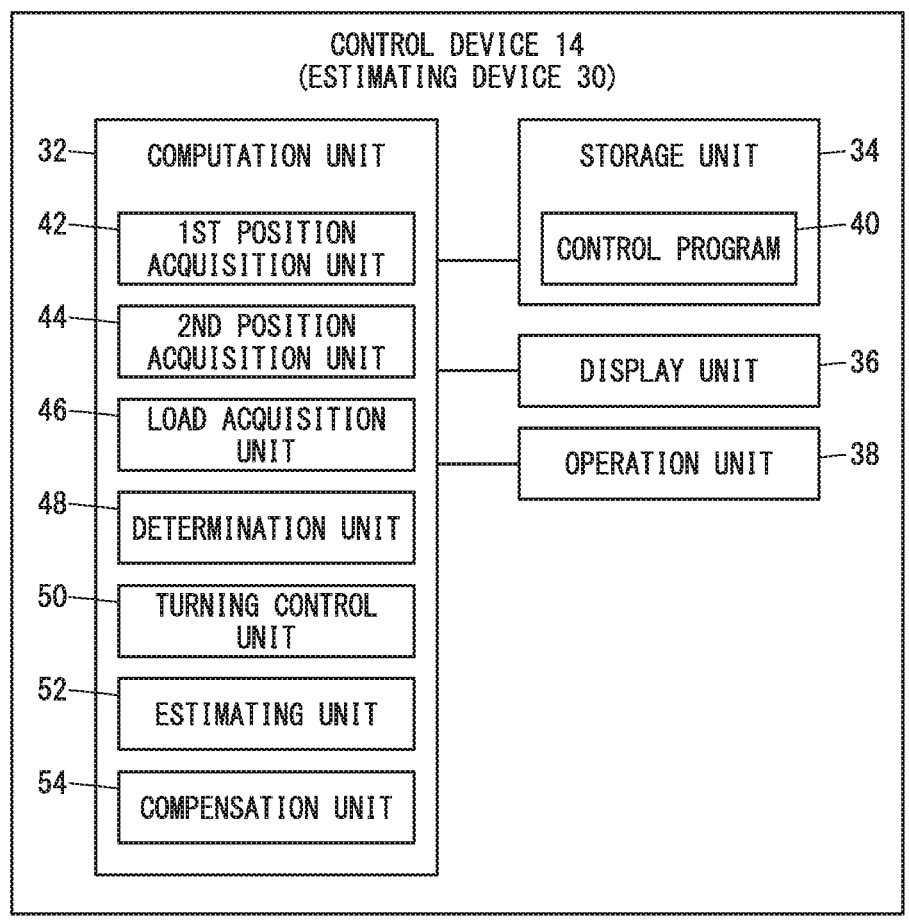
FIG. 8 is a schematic configuration diagram of an estimating device according to a second modification.

FIG. 8 is a schematic configuration diagram of the estimating device 30 according to a second modification.

The estimating device 30 (the control device 14 in which the estimating device 30 is provided) may be further equipped with a compensation unit 54. The compensation unit 54 compensates the first directional position $P_x$ based on the first directional load $L_1$, and compensates the second directional position $P_y$ based on the second directional load $L_2$.

The tool 20 that undergoes relative movement with respect to the machined object 16 while performing cutting receives a repulsive force from the machined object 16. Accordingly, there is a concern that, from an extremely detailed point of view, the first directional position $P_x$ and the second directional position $P_y$ selected by the estimating unit 52 may deviate respectively from the actual position of the rotary axis C in the first direction and the actual position of the rotary axis C in the second direction, due to the influence of the aforementioned repulsive force. The deviation that occurs in this instance may be ignored without any particular problem in certain cases, but it is preferable for such a deviation to be considered, in order to ensure that the position of the rotary axis C is estimated more accurately.

In this instance, for example, all of the repulsive force, the drive current and the torque of the first motor 22, and the positional deviation in the first direction change significantly depending on whether or not the tool 20 which moves relatively to the first direction is cutting the machined object 16. In other words, the first directional load $L_1$ based on any one of the positional deviation, the drive current, and the torque of the first motor 22 has a correlation with the above-described repulsive force. Similarly, the second directional load $L_2$ based on any one of the positional deviation, the drive current, and the torque of the second motor 24 has a correlation with the above-described repulsive force.

Accordingly, based on the above-described correlation and the first directional load $L_1$, the first directional position $P_x$ can be compensated so as to reduce the influence of the above-described repulsive force. Similarly, based on the above-described correlation and the second directional load $L_2$, the second directional position $P_y$ can be compensated so as to reduce the influence of the above-described repulsive force. Consequently, the estimating device 30 is capable of determining the first directional position $P_x$ and the second directional position $P_y$ with higher accuracy. The estimating device 30 according to the present modification is particularly useful when used in connection with a precision processing machine that performs the turning process with a machining accuracy of less than or equal to 100 nm.

(Modification 3)

Figure 9:
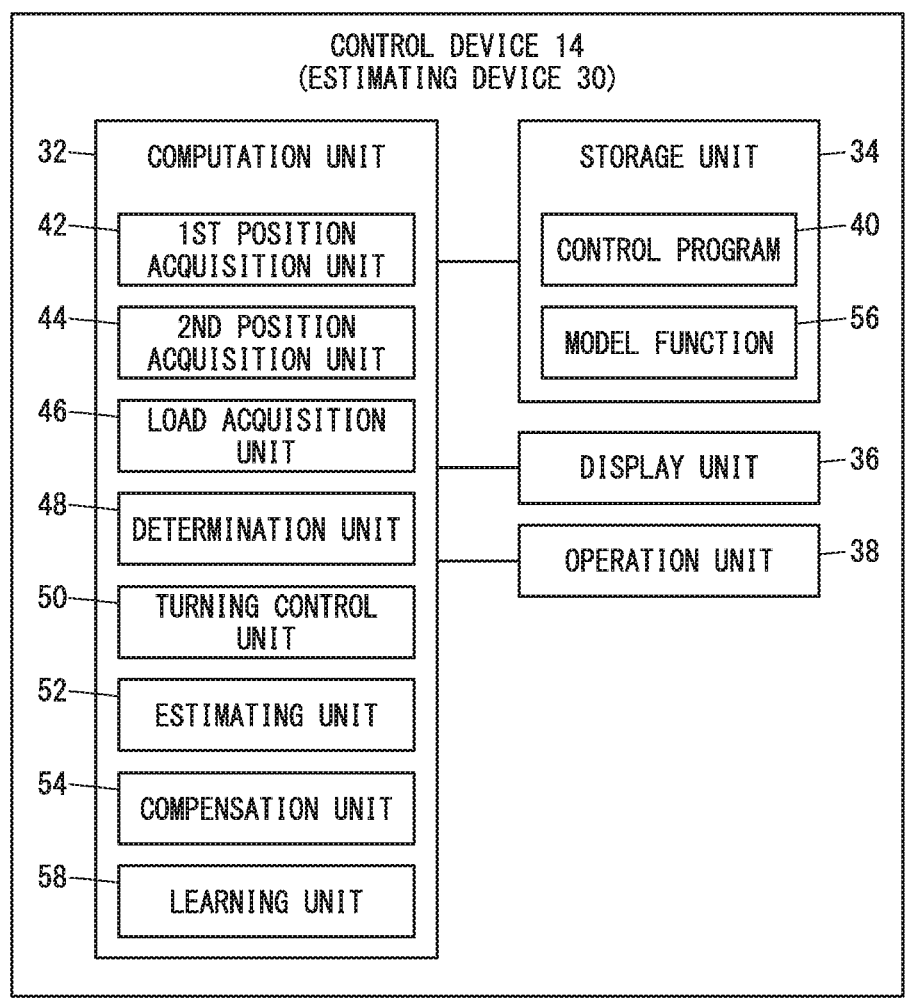
FIG. 9 is a schematic configuration diagram of an estimating device according to a third modification.

FIG. 9 is a schematic configuration diagram of the estimating device 30 according to a third modification.

The present modification is related to the aforementioned Modification 2. The estimating device 30 (the control device 14 in which the estimating device 30 is provided) according to the second modification may further include a model function 56, and a learning unit 58.

Conceptually, the model function 56 is a function defined on the basis of the correlation described in the second modification. The model function 56 can be stored in the storage unit 34. The model function 56 outputs a first directional compensation amount by having the first directional load $L_1$ input thereto, and outputs a second directional compensation amount by having the second directional load $L_2$ input thereto. The first directional compensation amount is obtained, for example, as a value to multiply the first directional position $P_x$ by, or as a value to be added to the first directional position $P_x$, or as a value to be subtracted from the first directional position $P_x$. In a similar manner, the second directional compensation amount is obtained, for example, as a value to multiply the second directional position $P_y$ by, or as a value to be added to the second directional position $P_y$, or as a value to be subtracted from the second directional position $P_y$. The compensation unit 54 according to the present modification is capable of compensating the first directional position $P_x$ based on the first directional compensation amount, and compensating the second directional position $P_y$ based on the second directional compensation amount.

The model function 56 is of a configuration also referred to as a so-called neural network (multilayer neural network). More specifically, the model function 56 newly generates a plurality of values (neurons) by applying weightings to input values (the first directional load $L_1$) using a plurality of weights. In addition, by repeating a plurality of times application of the weightings, addition, and application of an activation function to the plurality of neurons, ultimately, one neuron indicative of the first directional compensation amount is output. The same applies when the second directional compensation amount is output from the second directional load $L_2$.

The learning unit 58 serves to optimize the above-described model function 56. Concerning the compensation of the first directional position $P_x$ and the second directional position $P_y$ through use of the model function 56, the accuracy thereof changes depending on the number of layers of the neural network (how many times that weighting and addition is performed), the type of the activation function possessed by the model function 56, and setting of the weightings. The learning unit 58 optimizes the model function 56, in a manner so as to minimize the difference between the position of the rotary axis C (the first directional position $P_x$ and the second directional position $P_y$) which has been compensated by the compensation unit 54 using the model function 56, and the actual position of the rotary axis C. Such optimization can be performed, for example, by changing at least one of the aforementioned weightings, the number of layers of the multilayer neural network, and the activation function. Moreover, the above-described difference is not limited to being a simple difference, and may be, for example, a squared value of such a difference. The actual position of the rotary axis C can be determined by the operator observing the machined surface of the machined object 16 (the machined product) following completion of the turning process.

According to the estimating device 30 of the present modification, the position of the rotary axis C can be estimated with higher accuracy. Further, since the learning unit 58 optimizes the model function 56, as repeatedly carrying out estimation and compensation of the position of the rotary axis C by the estimating device 30, a further improvement in accuracy can be expected.

Second Embodiment

A description will be given below concerning a second embodiment. The second embodiment relates to a system (estimating system) 60 comprising a plurality of machine tools 10 each containing the estimating device 30 according to the second modification. It should be noted that, in the following description, matters which have already been described in relation to the above-described first embodiment and the modifications thereof may be appropriately omitted.

Figure 10:
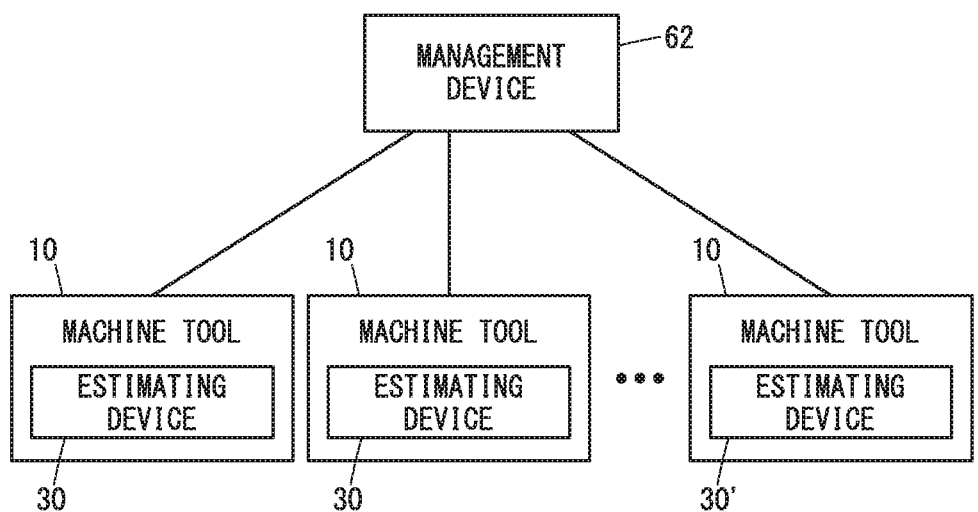
FIG. 10 is a schematic configuration diagram of a system according to a second embodiment.

FIG. 10 is a schematic configuration diagram of the system 60 according to the second embodiment.

The system 60 is equipped with a plurality of machine tools 10, and a management device 62. Each of the plurality of machine tools 10, for example, is a precision processing machine. The number of machine tools 10 provided in the system 60 is not particularly limited. Each of the plurality of machine tools 10 includes the estimating device 30. Although illustration thereof is omitted in FIG. 10, the machine tool 10 comprises the control device 14. As has been described in connection with the first embodiment, the estimating devices 30 may be integrally provided in the control devices 14 of the machine tools 10, respectively.

The estimating devices 30 for the plurality of machine tools 10 comprise the same configuration as that described in the first embodiment and the second modification (FIG. 8), except for the estimating device 30' which will be described later. More specifically, each of the estimating devices 30 for the plurality of machine tools 10 provided in the system 60 includes the first position acquisition unit 42, the second position acquisition unit 44, the turning control unit 50, the estimating unit 52, and the compensation unit 54.

Accordingly, in the plurality of machine tools 10 provided in the system 60, by using the estimating device 30 provided in each one thereof, the position of the rotary axis C of the machined object 16 that is subjected to the turning process by each can be estimated accurately based on the first directional position $P_x$ and the second directional position $P_y$. Further, the first directional position $P_x$ and the second directional position $P_y$ can be compensated.

Figure 11:
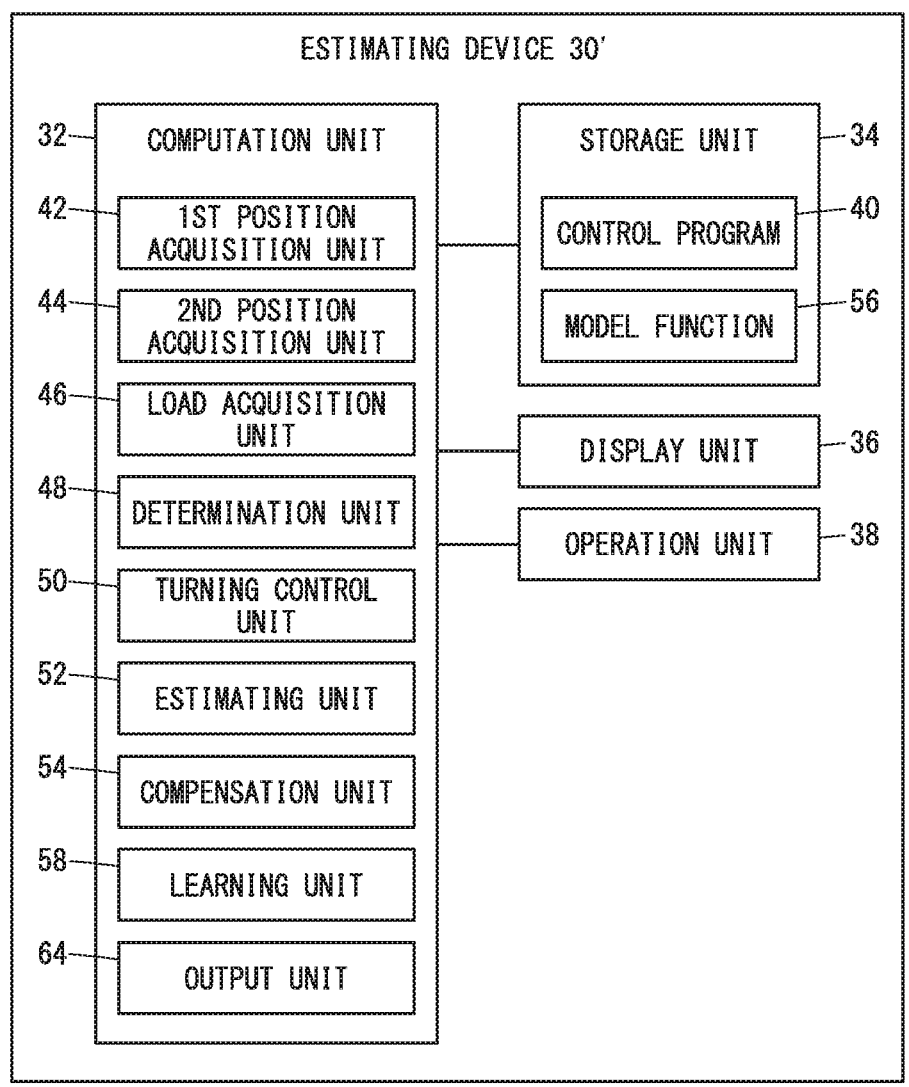
FIG. 11 is a schematic configuration diagram of an estimating device according to the second embodiment.

FIG. 11 is a schematic configuration diagram of the estimating device 30' according to the second embodiment.

At least one of the estimating devices 30 of the plurality of machine tools 10 is equipped with the configuration shown in FIG. 11. Hereinafter, such an estimating device 30 will also be referred to as an estimating device 30' in order to distinguish it from the other estimating devices 30.

Within the configuration of the estimating device 30', the model function 56 and the learning unit 58 are the same as the elements of the same names that were described in Modification 3 (see FIG. 9). The estimating device 30' is capable of compensating the first directional position $P_x$ and the second directional position $P_y$ by using the model function 56. Further, the learning unit 58 is capable of optimizing the model function 56 in a manner so that the difference between the estimated position of the rotary axis C and the actual position of the rotary axis C obtained by observation is minimized.

The estimating device 30' is further equipped with an output unit 64. The output unit 64 serves to output the model function 56, which has been optimized by the learning unit 58, to the management device 62.

The management device 62 is an electronic device equipped with an arithmetic processing function, and includes a computation unit 32 (CPU) and a storage unit 34 (a RAM and a ROM). The plurality of machine tools 10 are connected to the management device 62 via a wired or wireless network.

In the system 60 having the above-described configuration, the model function 56 which has been optimized by the learning unit 58 of the estimating device 30' is output from the estimating device 30' to the management device 62. The management device 62 outputs the model function 56 which was input thereto from the estimating device 30', to another machine tool 10 connected to the management device 62 itself (i.e., a machine tool 10 in which the estimating device 30' is not provided).

The estimating device 30 of the machine tool 10 to which the model function 56 has been input from the management device 62 is capable of compensating the position of the rotary axis C, based on the first directional compensation amount and the second directional compensation amount determined by the input model function 56.

In the foregoing manner, according to the system 60 of the present embodiment, even with a machine tool 10 that is not equipped with the learning unit 58 and the model function 56, the position of the rotary axis C of the machined object 16 that is subjected to turning can be easily and accurately estimated.

Inventions that can be Obtained from the Embodiments

The inventions that can be grasped from the above-described respective embodiments and the respective modifications thereof will be described below.

<First Invention>

In the estimating device (30) for estimating the position of the rotary axis (C) in relation to the machine tool (10) equipped with the tool (20), the machine tool being configured to perform a lathe turning process, by using the tool (20), on the machined object (workpiece) (16) that rotates about the rotary axis (C), the machine tool (10) includes the first motor (22) that causes the tool (20) to move relatively with respect to the machined object (16) along the first direction perpendicular to the rotary axis (C), and the second motor (24) that causes the tool (20) to move relatively with respect to the machined object (16) along the second direction perpendicular to the rotary axis (C) and the first direction, and the estimating device (30) includes the first position acquisition unit (42) which acquires the position of the tool (20) in the first direction, the second position acquisition unit (44) which acquires the position of the tool (20) in the second direction, the load acquisition unit (46) that acquires the first directional load ($L_1$) of the tool (20) in the first direction, and the second directional load ($L_2$) of the tool (20) in the second direction, the determination unit (48) that determines whether or not the first directional load ($L_1$) and the second directional load ($L_2$) are less than or equal to a predetermined threshold value (Th), the turning control unit (50) that, by controlling the first motor (22) based on the first command, performs a lathe turning process on the machined object (16) until the first directional load ($L_1$) becomes less than or equal to the threshold value (Th), and thereafter, by controlling the second motor (24) based on the second command, performs a lathe turning process on the machined object (16) until the second directional load ($L_2$) becomes less than or equal to the threshold value (Th), and the estimating unit (52) which selects, as the first directional position ($P_x$), the position of the tool (20) in the first direction at the time when the first directional load ($L_1$) has become less than or equal to the threshold value (Th), selects, as the second directional position ($P_y$), the position of the tool (20) in the second direction at the time when the second directional load ($L_2$) has become less than or equal to the threshold value (Th), and estimates the position of the rotary axis (C) on a plane defined by the first direction and the second direction, based on the selected first directional position ($P_x$) and the selected second directional position ($P_y$).

In accordance with such features, the estimating device (30) is provided, in which it is possible to easily and accurately estimate the position of the rotary axis (C) of the machined object (16) which is subjected to the lathe turning process by the machine tool (10).

The load acquisition unit (46) may acquire the first directional load ($L_1$) based on the drive current or the torque of the first motor (22), and may acquire the second directional load ($L_2$) based on the drive current or the torque of the second motor (24). In accordance with such features, the estimating device (30) is provided, which estimates the position of the rotary axis (C) of the machined object (16) based on the drive current or the torque of the first motor (22), and the drive current or the torque of the second motor (24).

The load acquisition unit (46) may acquire the first directional load ($L_1$) based on the fluctuation range of deviation of the position acquired by the first position acquisition unit (42) from the position indicated by the first command, and may acquire the second directional load ($L_2$) based on the fluctuation range of deviation of the position acquired by the second position acquisition unit (44) from the position indicated by the second command. In accordance with such features, the estimating device (30) is provided for estimating the position of the rotary axis (C) of the machined object (16), based on the fluctuation range of deviation of the position acquired by the first position acquisition unit (42) from the position indicated by the first command, and the fluctuation range of deviation of the position acquired by the second position acquisition unit (44) from the position indicated by the second command.

The load acquisition unit (46) may acquire, as the first directional load ($L_1$), the first load in the first direction based on the fluctuation range of deviation of the position acquired by the first position acquisition unit (42) from the position indicated by the first command, and the second load in the first direction based on the drive current or the torque of the first motor (22), and may acquire, as the second directional load ($L_2$), the third load in the second direction based on the fluctuation range of deviation of the position acquired by the second position acquisition unit (44) from the position indicated by the second command, and the fourth load in the second direction based on the drive current or the torque of the second motor (24), in the case that each of the first load and the second load is less than or equal to the threshold value (Th), the turning control unit (50) may determine that the first directional load ($L_1$) is less than or equal to the threshold value (Th), and in the case that each of the third load and the fourth load is less than or equal to the threshold value (Th), the turning control unit (50) may determine that the second directional load ($L_2$) is less than or equal to the threshold value (Th), and the estimating unit (52) may select, as the first directional position ($P_x$), an average value of the first directional position of the tool (20) at a time when the first load has become less than or equal to the threshold value (Th), and the first directional position of the tool (20) at a time when the second load has become less than or equal to the threshold value (Th), and may select, as the second directional position ($P_y$), an average value of the second directional position of the tool (20) at a time when the third load has become less than or equal to the threshold value (Th), and the second directional position of the tool (20) at a time when the fourth load has become less than or equal to the threshold value (Th). In accordance with such features, it can be expected that the reliability of the first directional position ($P_x$) and the second directional position ($P_y$) that are selected by the estimating unit (52) will be improved.

The machine tool (10) may be a precision processing machine configured to perform a lathe turning process on the machined object (16) based on a command with a machining accuracy that is less than or equal to 100 nm, and the turning control unit (50) may control the first motor (22) based on the first command with an accuracy that is less than or equal to 100 nm, and may control the second motor (24) based on the second command with an accuracy that is less than or equal to 100 nm. In accordance with this feature, the estimating device (30) can also be applied to a machine tool (10) that carries out the lathe turning process with a machining accuracy of less than or equal to 100 nm.

The estimating device (30) may be provided in the control device (14) which is possessed by the machine tool (10). In accordance with this feature, the estimating device (30) can be disposed integrally with the control device (14) of the machine tool (10).

There may further be provided the compensation unit (54) that compensates the first directional position ($P_x$) based on the first directional load ($L_1$), and compensates the second directional position ($P_y$) based on the second directional load ($L_2$). In accordance with such features, the accuracy of the estimation performed by the estimating device (30) can be further enhanced.

There may further be provided the model function (56) that determines the first directional compensation amount based on the first directional load ($L_1$), and determines the second directional compensation amount based on the second directional load ($L_2$), the input unit to which the position of the rotary axis (C) observed by the operator after completion of the lathe turning process is input, and the learning unit (58) which optimizes the model function (56) in a manner so that the difference between the position of the rotary axis (C) as compensated by the compensation unit (54) and the position of the rotary axis (C) as observed by the operator is minimized, wherein the compensation unit (54) may compensate the first directional position ($P_x$) based on the first directional compensation amount, and may compensate the second directional position ($P_y$) based on the second directional compensation amount. In accordance with such features, the accuracy of the estimation performed by the estimating device (30) can be further enhanced.

<Second Invention>

The estimating system (60) is equipped with the plurality of machine tools (10) each containing, from among the above-described estimating devices (30), the estimating device (30) that is further equipped with the compensation unit (54). The estimating system includes the management device (62) connected to the plurality of machine tools (10). At least one of the estimating devices (30) of the machine tools (10) further includes the model function (56) that determines the first directional compensation amount based on the first directional load ($L_1$), and determines the second directional compensation amount based on the second directional load ($L_2$), the input unit to which the position of the rotary axis (C) observed by the operator after completion of the lathe turning process is input, the learning unit (58) which optimizes the model function (56) in a manner so that the difference between the position of the rotary axis (C) as compensated by the compensation unit (54) and the position of the rotary axis (C) as observed by the operator is minimized, and the output unit (64) that outputs to the management device (62) the model function (56) that has been optimized by the learning unit (58), wherein the management device (62) outputs the model function (56) input thereto to another machine tool (10), and the machine tool (10) to which the model function (56) has been input from the management device (62) compensates the position of the rotary axis (C) based on the first directional compensation amount and the second directional compensation amount as determined by the model function (56).

In accordance with such features, the estimating system (60) is provided, in which it is possible to easily and accurately estimate the position of the rotary axis (C) of the machined object (16) which is subjected to the lathe turning process by the machine tools (10).

What is claimed is:

1. An estimating device for estimating a position of a rotary axis in relation to a machine tool equipped with a tool, the machine tool being configured to perform a lathe turning process, by using the tool, on a workpiece that rotates about the rotary axis;
the machine tool comprising:
a first motor configured to cause the tool to move relatively with respect to the workpiece along a first direction perpendicular to the rotary axis; and
a second motor configured to cause the tool to move relatively with respect to the workpiece along a second direction perpendicular to the rotary axis and the first direction,
the estimating device comprising:
a first position acquisition unit configured to acquire a position of the tool in the first direction;
a second position acquisition unit configured to acquire a position of the tool in the second direction;
a load acquisition unit configured to acquire a first directional load of the tool in the first direction, and a second directional load of the tool in the second direction;
a determination unit configured to determine whether or not the first directional load and the second directional load are less than or equal to a predetermined threshold value;
a turning control unit configured to, by controlling the first motor based on a first command, perform a lathe turning process on the workpiece until the first directional load becomes less than or equal to the threshold value, and thereafter, by controlling the second motor based on a second command, perform a lathe turning process on the workpiece until the second directional load becomes less than or equal to the threshold value; and
an estimating unit configured to select, as a first directional position, a position of the tool in the first direction at a time when the first directional load has become less than or equal to the threshold value, select, as a second directional position, a position of the tool in the second direction at a time when the second directional load has become less than or equal to the threshold value, and estimate a position of the rotary axis on a plane defined by the first direction and the second direction, based on the selected first directional position and the selected second directional position.

2. The estimating device according to claim 1, wherein the load acquisition unit acquires the first directional load based on a drive current or a torque of the first motor, and acquires the second directional load based on a drive current or a torque of the second motor.

3. The estimating device according to claim 1, wherein the load acquisition unit acquires the first directional load based on a fluctuation range of deviation of the position acquired by the first position acquisition unit from a position indicated by the first command, and acquires the second directional load based on a fluctuation range of deviation of the position acquired by the second position acquisition unit from a position indicated by the second command.

4. The estimating device according to claim 1, wherein:
the load acquisition unit acquires, as the first directional load, a first load in the first direction based on a fluctuation range of deviation of the position acquired by the first position acquisition unit from a position indicated by the first command, and a second load in the first direction based on a drive current or a torque of the first motor, and acquires, as the second directional load, a third load in the second direction based on a fluctuation range of deviation of the position acquired by the second position acquisition unit from a position indicated by the second command, and a fourth load in the second direction based on a drive current or a torque of the second motor;
in a case that each of the first load and the second load is less than or equal to the threshold value, the turning control unit determines that the first directional load is less than or equal to the threshold value, and in a case that each of the third load and the fourth load is less than or equal to the threshold value, the turning control unit determines that the second directional load is less than or equal to the threshold value; and
the estimating unit selects, as the first directional position, an average value of the first directional position of the tool at a time when the first load has become less than or equal to the threshold value, and the first directional position of the tool at a time when the second load has become less than or equal to the threshold value, and selects, as the second directional position, an average value of the second directional position of the tool at a time when the third load has become less than or equal to the threshold value, and the second directional position of the tool at a time when the fourth load has become less than or equal to the threshold value.

5. The estimating device according to claim 1, wherein:
the machine tool is a precision processing machine configured to perform a lathe turning process on the workpiece based on a command with a machining accuracy that is less than or equal to 100 nm; and
the turning control unit controls the first motor based on the first command with an accuracy that is less than or equal to 100 nm, and controls the second motor based on the second command with an accuracy that is less than or equal to 100 nm.

6. The estimating device according to claim 1, wherein the estimating device is provided in a control device possessed by the machine tool.

7. The estimating device according to claim 1, further comprising a compensation unit configured to compensate the first directional position based on the first directional load, and to compensate the second directional position based on the second directional load.

8. The estimating device according to claim 7, further comprising:
a model function configured to determine a first directional compensation amount based on the first directional load, and to determine a second directional compensation amount based on the second directional load;
an input unit to which the position of the rotary axis observed by an operator after completion of a lathe turning process is input; and a learning unit configured to optimize the model function in a manner so that a difference between the position of the rotary axis as compensated by the compensation unit and the position of the rotary axis as observed by the operator is minimized;

wherein the compensation unit compensates the first directional position based on the first directional compensation amount, and compensates the second directional position based on the second directional compensation amount.

9. An estimating system equipped with a plurality of machine tools each containing the estimating device according to claim 7, the estimating system comprising:

a management device connected to the plurality of machine tools, wherein at least one of the estimating devices of the machine tools further comprises:

a model function configured to determine a first directional compensation amount based on the first directional load, and to determine a second directional compensation amount based on the second directional load;

an input unit to which the position of the rotary axis observed by an operator after completion of a lathe turning process is input;

a learning unit configured to optimize the model function in a manner so that a difference between the position of the rotary axis as compensated by the compensation unit and the position of the rotary axis as observed by the operator is minimized; and an output unit configured to output to the management device the model function that has been optimized by the learning unit; and wherein the management device outputs the model function input thereto to another machine tool; and the machine tool to which the model function has been input from the management device compensates the position of the rotary axis based on the first directional compensation amount and the second directional compensation amount as determined by the model function.

* * * * *